Sept. 18, 1934.  L. GLOOR  1,973,869
ICE FISHING MECHANISM
Filed March 23, 1933    2 Sheets-Sheet 1
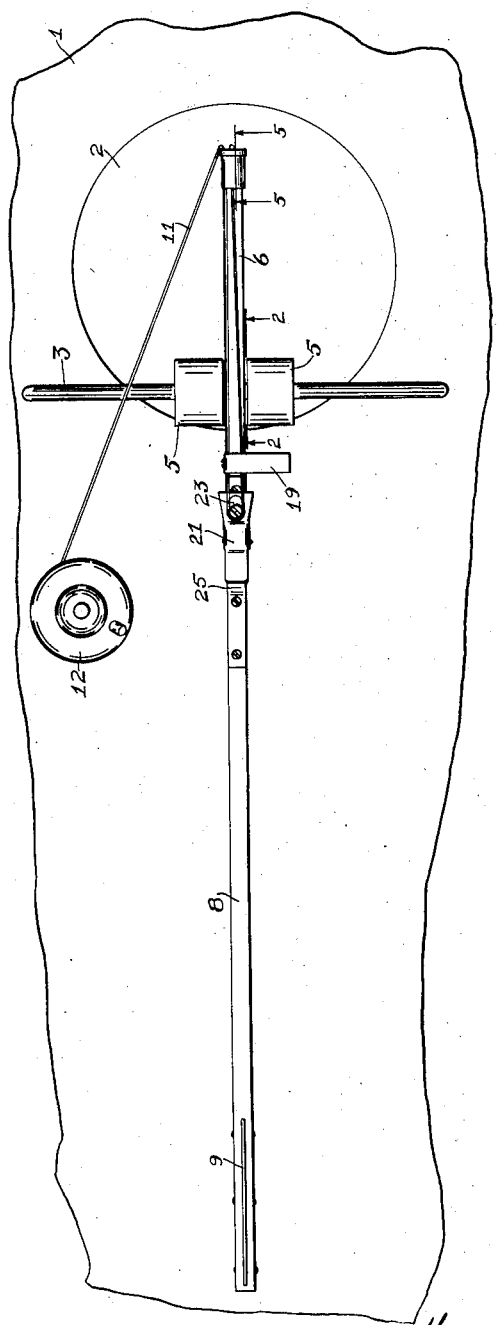
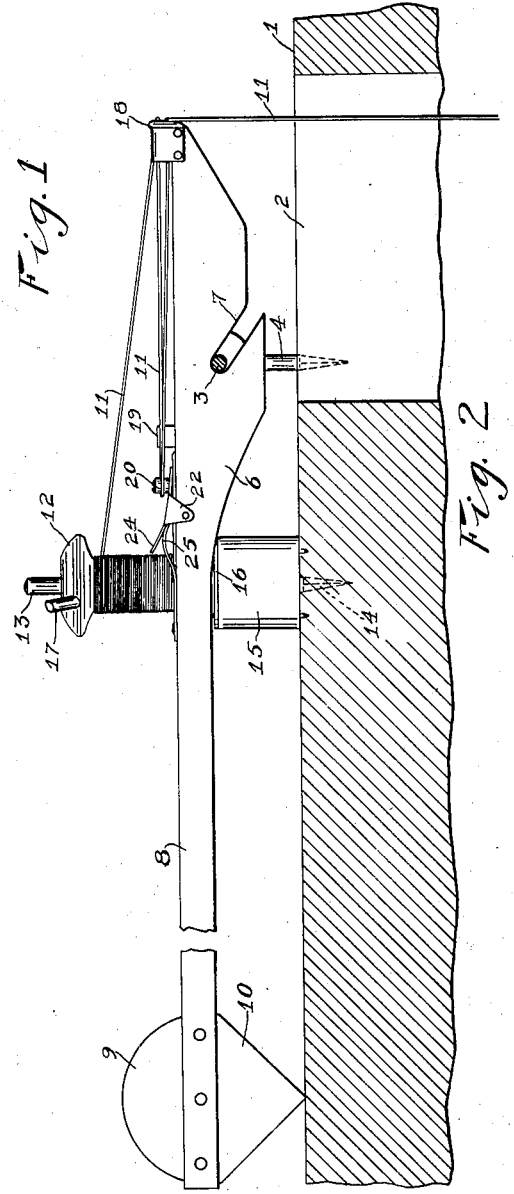
INVENTOR
Louis Gloor
BY Harold E. Stonebraker,
ATTORNEY Sept. 18, 1934.  L. GLOOR  1,973,869
ICE FISHING MECHANISM
Filed March 23, 1933  2 Sheets-Sheet 2

INVENTOR
Louis Gloor
BY
Harold E. Stonebraker
ATTORNEY

Patented Sept. 18, 1934

1,973,869

UNITED STATES PATENT OFFICE 1,973,869

ICE FISHING MECHANISM

Louis Gloor, Rochester, N. Y.

Application March 23, 1933, Serial No. 662,321

5 Claims. (Cl. 43—16)

This invention relates to ice fishing mechanism, and has for its purpose to provide an efficient and dependable structure for operating a visible signal or indicator when the line is pulled by a fish taking hold of the bait.

The invention has for its further object to afford a mechanism whereby an indicator or signal is mounted to swing about a horizontal axis and is operated from its horizontal position by the downward pull on the line.

A further purpose of the invention is to connect a line with a pivoted indicating arm in such a way that the line may be paid out without disturbing the position of the indicator while a pull exerted downwardly on the line acts directly on the indicating arm and moves it to indicating position.

Another object of the improvement is to provide a construction comprising a simple arrangement of few parts which can be quickly assembled for operation and readily taken apart when not in use.

To these and other ends, the invention consists in the arrangement and combination of parts that will appear clearly from the following description, when read in conjunction with the accompaying drawings, the novel features being pointed out in the claims at the end of the description.

In the drawings:

Fig. 1 is a plan view showing one embodiment of the invention;

Fig. 2 is a longitudinal vertical sectional view on line 2—2 of Fig. 1 with parts appearing in side elevation;

Figure 4:
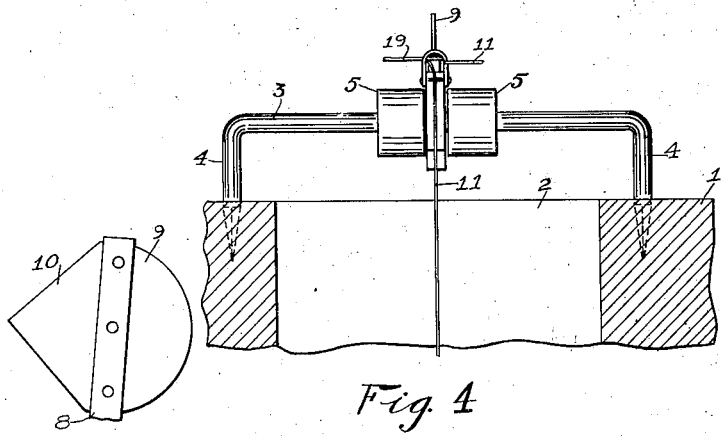
Fig. 4 is an end elevation looking toward the forward end of the mechanism.
Figure 5:
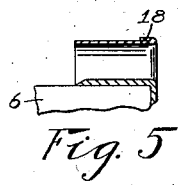
Fig. 5 is a detail sectional view on line 5—5 of Fig. 1.

Referring more particularly to the drawings in which like reference numerals refer to the same parts throughout the several views, the structure is shown as applied to a body of ice 1 provided with an opening 2 through which the line is dropped into the water.

The indicator or signal is preferably mounted for a swinging or pivotal movement about a horizontal axis, and to this end is mounted on a support comprising a horizontal rod 3 having downwardly bent arms 4 with pointed projections or extremities by which it can be driven into and supported in the ice. The support 3 has fixed thereon a pair of blocks or centering members 5 between which the indicating arm is arranged.

Figure 3:
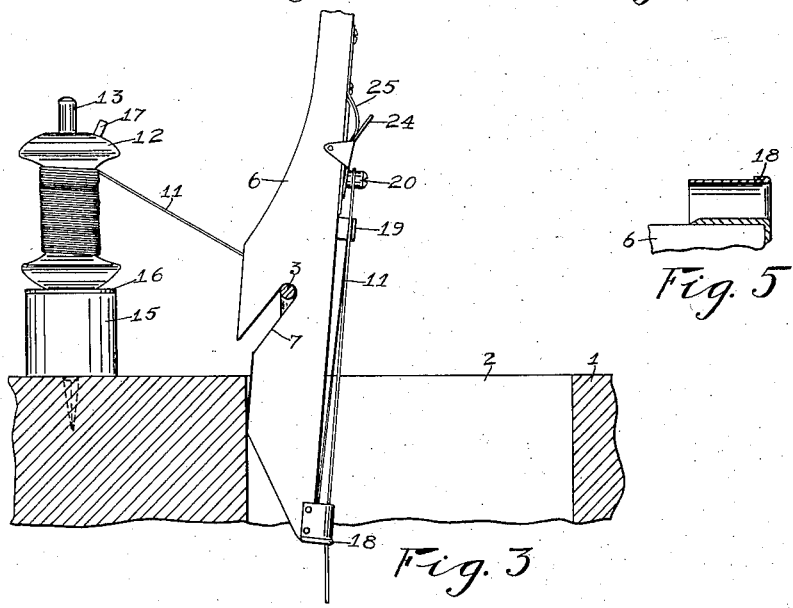
Fig. 3 is a side elevation illustrating the indicator or signal in raised position.

The latter comprises a body portion 6 that is slotted at 7 to permit being removably positioned on the support 3 upon which it has a swinging or pivotal movement from the position shown in Fig. 2 to that shown in Fig. 3. The indicating arm also includes an elongated tail piece 8 at the end of which is secured a signal or indicator in the form of a vane 9 pointed at its lower extremity at 10 to afford means for resting lightly on the surface of the ice. The vane 9 may be colored or otherwise formed so that when swung to the upper position as in Fig. 3, it is readily and quickly visible.

The line, designated at 11, is mounted on a spool 12 which latter is rotatably supported on a post 13 that has a sharpened or pointed lower end 14 that can be driven into the ice. The post 13 also carries fixedly mounted thereon a block or base 15 that rests upon the upper surface of the ice while 16 is a rubber or other friction washer on the top of the block 15 and in contact with the rotatable spool 12, functioning to hold the latter against excessively fast turning and thereby prevent overrunning or tangling of the line.

17 designates a handle on the spool 12 by which the latter can be turned to wind up the line. The line extends from the spool 12 through a sleeve or keeper 18 secured to the outer end of the indicating arm, thence under a guide plate 19 that is fixedly mounted on the indicating arm, around the post 20 that is also fixed on the indicating arm, returning under the guide plate 19, through the keeper 18 and downwardly into the water, as shown in Fig. 2. This is the normal position of the parts when the line is in the water, and the indicating arm is so balanced with reference to the support 3 that it remains in horizontal position under ordinary conditions, but a slight downward pull on the line 11 is sufficient to draw the forward end of the indicating arm downwardly and throw the signal upwardly, as shown in Fig. 3. When the indicating arm is in normal position, the line may be paid out or drawn in by turning the spool 12 without affecting the position of the indicating arm. The line is positioned in the relation just described by passing a loop of it through the keeper 18, under the guide plate 19 and around the post 20.

The line can be instantaneously released from the indicating arm when desired by a mechanism that lifts it off of the post 20, thereby permitting the loop to pass under the guide plate 19 and through the keeper 18. This is accomplished by a releasing device preferably comprising a plate 21 which has ears 22 by which it is pivoted to the sides of the indicating arm. The plate 21 also has an opening 23 that passes over the post 20 when the plate is in normal position, as shown in Fig. 2. 25 is a leaf spring secured to the top of the indicating arm and engaging under plate 21, acting normally to hold the latter in the position shown in Fig. 2, with its forward end down around the post 20 and under the line 11.

Figure 6:
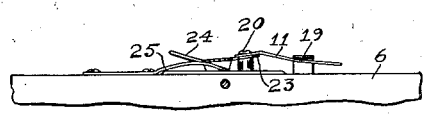
Fig. 6 is an enlarged detail side elevation partially in section of the line releasing means.

The plate 21 also carries a finger piece 24 at its rear end by which it may be depressed against the action of the spring 25, as shown in Fig. 6. This movement of the finger piece 24 moves the forward end of the plate 23 upwardly, as shown in Fig. 6, above the post 20, such upward movement forcing the line 11 also upwardly until it is free of the post 20 and thereby released from its connection with the indicator. On release of the finger piece 24, the plate 21 drops back to its normal position, as shown in Fig. 2, under the impulse of the spring 25.

In operation, the supporting rod 3 is first positioned by driving the points 4 into the ice. The rod 13 and block 15 are then driven into the ice to receive the spool and line. The indicating arm is then placed on the bar 3 by engagement with slot 7. A loop of the line is passed through keeper 18, under guide plate 19, and over the post 20, and the parts are ready for operation. The line can be paid out or drawn in, having a sliding movement around post 20, but any sudden pull on the line downwardly will draw downwardly the front end of the indicating arm and raise its rear end or signal to upper position.

I claim:

1. Ice fishing mechanism comprising an indicating arm pivoted to swing about a horizontal axis, means for so connecting a line to the indicating arm that a pull exerted downwardly on the line will draw the indicating arm upwardly, said means comprising a keeper at the inner end of the indicating arm through which a loop of the line may be passed, and a post on the indicating arm around which the loop engages.

2. Ice fishing mechanism comprising an indicating arm pivoted to swing about a horizontal axis, means for so connecting a line to the indicating arm that a pull exerted downwardly on the line will draw the indicating arm upwardly, said means comprising a keeper at the inner end of the indicating arm through which a loop of the line may be passed, a post on the indicator around which the loop engages, and means on the indicating arm engageable with the line for pushing the latter upwardly to release it from said post.

3. Ice fishing mechanism comprising a horizontal support positionable on a body of ice, an indicating arm having a slot by which it is removably positionable on said support, means for associating a line with the front end of the indicating arm whereby a pull downwardly on the line will draw the indicator upwardly, and means associated with the rear end of the indicating arm permitting the latter to rest upon the surface of the ice and acting as a signal when the indicating arm is raised.

4. Ice fishing mechanism comprising a horizontal supporting rod, an indicating arm having a body portion that is slotted for removable engagement with said supporting rod, centering devices on the rod between which the indicating arm is located, a keeper at the forward end of the indicating arm through which a line is movable, a post on the indicating arm around which the line passes, and releasing means movable upwardly around said post and operable to force the line out of engagement therewith.

5. Ice fishing mechanism comprising an indicating arm pivoted to swing about a horizontal axis, a keeper at the inner end of the indicating arm through which a loop of a line may be passed, and means on the indicating arm for releasably holding said loop, the loop extending from one end of the indicating arm for a portion of its length.

LOUIS GLOOR.